US009903988B2

(12) United States Patent
Merrill et al.

(10) Patent No.: US 9,903,988 B2
(45) Date of Patent: Feb. 27, 2018

(54) STABILIZED INFRARED ABSORBING DISPERSIONS

(71) Applicant: 3M INNOVATIVE PROPERTIES COMPANY, St. Paul, MN (US)

(72) Inventors: William W. Merrill, Mahtomedi, MN (US); David T. Yust, Woodbury, MN (US); Patrick M. Crain, Stillwater, MN (US); Neeraj Sharma, Woodbury, MN (US); Jung-Sheng Wu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/651,142

(22) PCT Filed: Dec. 11, 2013

(86) PCT No.: PCT/US2013/074273
§ 371 (c)(1),
(2) Date: Jun. 10, 2015

(87) PCT Pub. No.: WO2014/093431
PCT Pub. Date: Jun. 19, 2014

(65) Prior Publication Data
US 2016/0195650 A1  Jul. 7, 2016

Related U.S. Application Data

(60) Provisional application No. 61/735,811, filed on Dec. 11, 2012.

(51) Int. Cl.
| G02B 5/12 | (2006.01) |
| G09F 3/10 | (2006.01) |
| G09F 3/16 | (2006.01) |
| G02B 5/20 | (2006.01) |
| G09F 13/16 | (2006.01) |
| G02B 5/28 | (2006.01) |
| G02B 5/02 | (2006.01) |
| G06K 7/14 | (2006.01) |
| H04N 5/225 | (2006.01) |
| G02B 5/22 | (2006.01) |
| G06K 19/06 | (2006.01) |
| G09F 3/00 | (2006.01) |
| G06K 7/12 | (2006.01) |

(52) U.S. Cl.
CPC ........... *G02B 5/208* (2013.01); *G02B 5/0284* (2013.01); *G02B 5/12* (2013.01); *G02B 5/201* (2013.01); *G02B 5/223* (2013.01); *G02B 5/285* (2013.01); *G06K 7/1447* (2013.01); *G06K 19/0614* (2013.01); *G06K 19/06103* (2013.01); *G09F 3/0294* (2013.01); *G09F 3/0297* (2013.01); *G09F 3/10* (2013.01); *G09F 13/16* (2013.01); *H04N 5/2256* (2013.01); *G06K 7/12* (2013.01)

(58) Field of Classification Search
CPC .......... G02B 5/12; G02B 5/201; G02B 5/208; G02B 5/223; G02B 5/285; G02B 5/0284; G09F 3/10; G09F 13/16; G09F 3/0294; G09F 3/0297; H04N 5/2256
USPC .... 252/586, 587; 428/35.5, 220, 412, 423.1, 428/473.5, 474.4, 500, 523
See application file for complete search history.

(56) References Cited

U.S. PATENT DOCUMENTS

| 5,512,095 | A | 4/1996 | Sens |
| 5,882,774 | A | 3/1999 | Jonza |
| 6,197,851 | B1 | 3/2001 | Maxwell |
| 6,261,656 | B1 | 7/2001 | Semersky |
| 6,323,340 | B1 | 11/2001 | Masuda |
| 6,352,761 | B1 | 3/2002 | Hebrink |
| 6,503,586 | B1 | 1/2003 | Wu |
| 6,613,819 | B2 | 9/2003 | Johnson |
| 6,830,713 | B2 | 12/2004 | Hebrink |
| 6,946,188 | B2 | 9/2005 | Hebrink |
| 7,187,396 | B2 | 3/2007 | Carroll, Jr. |
| 7,314,511 | B2 | 1/2008 | Campbell |
| 7,479,517 | B2 | 1/2009 | Kulkarni |
| 7,572,327 | B2 | 8/2009 | Vonwiller |
| 7,741,379 | B2 | 6/2010 | Bhatt |
| 8,304,536 | B2 | 11/2012 | Kato |
| 9,081,147 | B2 | 7/2015 | Merrill |
| 2002/0022140 | A1 | 2/2002 | Semersky |
| 2003/0126694 | A1 | 7/2003 | Ho |
| 2004/0106526 | A1 | 6/2004 | Baxter |
| 2004/0180159 | A1 | 9/2004 | Neal |
| 2004/0249113 | A1 | 12/2004 | Quillen |
| 2005/0176870 | A1 | 8/2005 | Kulkarni |
| 2006/0000388 | A1 | 1/2006 | Campbell |
| 2006/0052504 | A1 | 3/2006 | Xia |
| 2006/0105129 | A1 | 5/2006 | Xia |
| 2006/0106146 | A1 | 5/2006 | Xia |
| 2006/0106192 | A1 | 5/2006 | Xia |
| 2006/0107873 | A1 | 5/2006 | El-Shoubary |
| 2006/0205855 | A1 | 9/2006 | Xia |
| 2006/0276578 | A1 | 12/2006 | Xia |
| 2006/0287472 | A1 | 12/2006 | Jernigan |

(Continued)

FOREIGN PATENT DOCUMENTS

| EP | 1482077 | 12/2004 |
| EP | 1574540 | 9/2005 |

(Continued)

OTHER PUBLICATIONS

International Search Report for PCT International Application No. PCT/US2013/074273, dated Sep. 24, 2014, 3 pgs.

*Primary Examiner* — Bijan Ahvazi
(74) *Attorney, Agent, or Firm* — Lisa P. Fulton

(57) ABSTRACT

A dispersion, a resin containing the dispersion and polymer film formed from the resin are disclosed. The dispersion includes an infrared light absorbing pigment including organo-metallic particles being less than 1.5 micrometer or less than one micrometer in size. The dispersion also includes a dispersant including phosphorus and a polyol.

4 Claims, No Drawings

(56) References Cited

U.S. PATENT DOCUMENTS

| | | |
|---|---|---|
| 2007/0066714 A1 | 3/2007 | Xia |
| 2007/0066719 A1 | 3/2007 | Xia |
| 2007/0066720 A1 | 3/2007 | Venett |
| 2007/0066791 A1 | 3/2007 | Jernigan |
| 2007/0066794 A1 | 3/2007 | Jernigan |
| 2008/0027206 A1 | 1/2008 | Jenkins |
| 2008/0027208 A1 | 1/2008 | Quillen |
| 2008/0027209 A1 | 1/2008 | White |
| 2008/0042098 A1 | 2/2008 | Neal |
| 2008/0161472 A1 | 7/2008 | Jenkins |
| 2008/0293912 A1 | 11/2008 | Jernigan |
| 2008/0299344 A1 | 12/2008 | Colhoun |
| 2009/0266877 A1 | 10/2009 | Vonwiller |
| 2010/0048783 A1 | 2/2010 | Jernigan |
| 2010/0203437 A1 | 8/2010 | Yanagida |
| 2011/0034630 A1 | 2/2011 | Colhoun |
| 2011/0094413 A1 | 4/2011 | Ganapathiappan |
| 2011/0269952 A1 * | 11/2011 | Kang .................. C07D 487/22 540/140 |
| 2011/0278461 A1 | 11/2011 | Kobayashi |
| 2011/0281086 A1 | 11/2011 | Kobayashi |
| 2011/0318519 A1 | 12/2011 | Colhoun |
| 2012/0021152 A1 * | 1/2012 | Glaser .................. A01G 9/1438 428/35.5 |
| 2012/0220735 A1 | 8/2012 | Jernigan |
| 2013/0065979 A1 | 3/2013 | Kummet |

FOREIGN PATENT DOCUMENTS

| | | |
|---|---|---|
| EP | 2518096 | 10/2012 |
| JP | 2002-264203 | 9/2002 |
| JP | 2005-178313 | 7/2005 |
| JP | 2005-220060 | 8/2005 |
| JP | 2006-282980 | 10/2006 |
| JP | 2007-217544 | 8/2007 |
| JP | 2009-051774 | 3/2009 |
| WO | WO 1997-38855 | 10/1997 |
| WO | WO 1998-08895 | 3/1998 |
| WO | WO 1999-37708 | 7/1999 |
| WO | WO 1999-47602 | 9/1999 |
| WO | WO 2000-24832 | 5/2000 |
| WO | WO 2001-21709 | 3/2001 |
| WO | WO 2002-46286 | 6/2002 |
| WO | WO 2004-029163 | 4/2004 |
| WO | WO 2005-003235 | 1/2005 |
| WO | WO 2007-002981 | 1/2007 |
| WO | WO 2007-019951 | 2/2007 |
| WO | WO 2007-149955 | 12/2007 |
| WO | WO 2010-075340 | 7/2010 |
| WO | WO 2010-075357 | 7/2010 |
| WO | WO 2010-075363 | 7/2010 |
| WO | WO 2010-075373 | 7/2010 |
| WO | WO 2010-075383 | 7/2010 |
| WO | WO 2010-076968 | 7/2010 |
| WO | WO 2010-098002 | 9/2010 |
| WO | WO 2010-100964 | 9/2010 |
| WO | WO 2010-146107 | 12/2010 |
| WO | WO 2010146107 A1 * 12/2010 ....... B32B 17/10688 |
| WO | WO 2011-117218 | 9/2011 |
| WO | WO 2012-003213 | 1/2012 |
| WO | WO 2013-065662 | 5/2013 |
| WO | WO 2014-093428 | 6/2014 |

* cited by examiner

STABILIZED INFRARED ABSORBING DISPERSIONS

BACKGROUND

Multilayer optical film can include oriented layers that can be semi-crystalline and the birefringence of these layers provides large increases in the optical power over isotropic polymeric multilayers. Heating these multilayer optical films can at least partially melt the oriented material in order to reduce or remove the birefringence of the oriented optical layers, resulting in a reduction in the optical power of their reflection bands. In one useful case, the multilayer optical films include an infrared light absorbing dye or pigment. These multilayer optical films can thus absorb radiant energy, e.g. of an infrared light laser, selectively melting the oriented material in the optical packet containing the absorber, and reducing the reflectivity of that optical packet. Images can be constructed by selective exposure of the infrared light to the multilayer optical films. In this manner, controlled spatial patterning of the reflectivity across the multilayer optical film can be accomplished.

Simple addition of the un-dispersed infrared light absorber in powder form to the film resin can lead to process disruptions and reduced film quality. For example, large particles can cause flow defects that manifest as streaks, mottling, parabolically shaped flow lines or other marks, disrupting the uniformity, appearance and/or the performance of the cast and also drawn film. The variability of infrared light absorber within the film leads to uncertainty in the radiation exposure conditions needed for selective melting and imaging of the multilayer optical film, leading to under-heating or over-heating portions of the film. Localized over-heating of the infrared light absorber by a high-energy-flux laser results in charring and other defects in the imaged film.

SUMMARY

The present disclosure relates to stabilized infrared light absorbing dispersions, polyester resins containing these dispersions and polyester films formed from these polyester resins. In particular the present disclosure relates to the use of phosphorous-containing dispersants to stabilize infrared light absorbing pigments in the dispersion and to increase infrared light absorption and improve particle distribution uniformity.

In one aspect, a dispersion includes an infrared light absorbing pigment, a dispersant including phosphorus and a polyol. The infrared light absorbing pigment includes organo-metallic particles. The infrared light absorbing pigment absorbs at a selected wavelength in a range of 750-1100 nm at least 1.5 times as strongly as in a visible range of 500-560 nm. At least 99%, or at least 99.5%, or at least 99.9% of the organo-metallic particles are less than 1.5 micrometer in size.

In another aspect, a resin includes a polyester material, an infrared light absorbing pigment dispersed in the polyester material and a dispersant comprising phosphorus. The infrared light absorbing pigment includes organo-metallic particles. The infrared light absorbing pigment absorbs at a selected wavelength in a range of 750-1100 nm at least 1.5 times as strongly as in a visible range of 500-560 nm. At least 98%, or at least 99%, or at least 99.5% of the organo-metallic particles are less than 1.5 micrometer in size.

In still another aspect, a resin includes a polyester material, an infrared light absorbing pigment dispersed in the polyester material and a dispersant comprising phosphorus. The infrared light absorbing pigment includes organo-metallic particles. The infrared light absorbing pigment absorbs at a selected wavelength in a range of 750-1100 nm at least 1.5 times as strongly as in a visible range of 500-560 nm. No more than 0.005% of the total volume of the resin includes metal-containing particles greater than 1.5 micrometers in size.

In a further aspect, a polyester film includes an infrared light absorbing pigment dispersed in a polyester film layer. The infrared light absorbing pigment includes organo-metallic particles and a dispersant including phosphorus. The infrared light absorbing pigment absorbs at a selected wavelength in a range of 750-1100 nm at least 1.5 times as strongly as in a visible range of 500-560 nm. At least 98%, or at least 99%, or at least 99.5% of the organo-metallic particles are less than 1.5 micrometer in size.

In yet a further aspect, a polyester film includes an infrared light absorbing pigment dispersed in a polyester film layer. The infrared light absorbing pigment includes organo-metallic particles and a dispersant including phosphorus. The infrared light absorbing pigment absorbs at a selected wavelength in a range of 750-1100 nm at least 1.5 times as strongly as in a visible range of 500-560 nm. No more than 0.005% of the total volume of the film includes metal-containing particles greater than 1.5 micrometers in size.

These and various other features and advantages will be apparent from a reading of the following detailed description.

DETAILED DESCRIPTION

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "contain", "containing", "comprise", "comprising" or the like are used in their open ended sense, and generally mean "including, but not limited to". It will be understood that "consisting essentially of", "consisting of", and the like are subsumed in "comprising," and the like.

The term "pigment" refers to a material loaded above its solubility resulting in non-dissolved or dissolvable particles.

The term "decomposition temperature" refers to the temperature where a significant portion of the material degrades. For practical purposes, the decomposition temperature is considered the temperature at which the material loses more than 4% of its mass under an inert dry nitrogen atmosphere using a Thermo-Gravimetric Analysis (TGA) under a standard temperature scan rate of 10 degrees centigrade per minute.

The present disclosure relates to stabilized infrared light absorbing dispersions, polyester resins containing these dispersions and polymer films formed from these polyester resins. In particular the present disclosure relates to the use of phosphorous-containing dispersants to stabilize infrared light absorbing pigments in the dispersion and to increase infrared light absorption and improve particle distribution uniformity. The dispersion has a small pigment size with a narrow size distribution. The dispersion possesses high infrared light absorption, high visible light transmission, low haze, and temperature stability at resin and film processing temperatures. The dispersion can be used in polyester synthesis without degrading the polymer. The dispersion pigment has a measurable size distribution in a range from 0.1 to 1.5 micrometer or from 0.1 to 1 micrometer where at least 95%, 98%, 99% 99.5% or 99.9% of the pigment particles fall within this range. This dispersion provides a uniform distribution of pigment to the resin material and resulting formed polyester film while improving its imagability. In particular, the dispersants described herein enhance the optical properties of the resulting formed polyester film. The described phosphorus-containing dispersants can stabilize the infrared light absorbing pigments in the dispersions and increase infrared absorption efficiency through shifting the infrared absorption peak to higher wavelengths and boosting peak absorption. While the present disclosure is not so limited, an appreciation of various aspects of the disclosure will be gained through a discussion of the examples provided below.

This disclosure generally relates to infrared (IR) light absorbers, dispersants, medium (solvent, or principal liquid-phase component of a suspension), film, and the processes to make them. The infrared light absorbers or absorbing pigments include metal containing or metal comprising pigments, as described below. These pigments can have good thermal stability at polymer film processing temperature, such as up to 300 degrees centigrade or up to 280 degrees centigrade, for example. The medium (or solvent or principal liquid-phase component of a suspension) is used to disperse the pigment in and as a carrier to bring non-agglomerated particles to the next processing step. The medium does not interfere with the function of other components. In some cases, the medium is a reaction component for a copolyester making reaction. In some instances, the infrared light absorber, dispersants, and/or medium benefit from limited exposure to polymer film processing temperatures, for example, by the addition of a portion of the dispersion after the polymerization reaction has started.

In many embodiments the medium is a polyol. Polyol is an alcohol containing multiple hydroxyl groups, for example ethylene glycol is a polyol containing two hydroxyl groups. The dispersants (or surfactant or dispersing aides) are used to prevent particles from agglomerating or re-agglomeration after separating from a milling process (to form a particular size distribution of pigment particles, if needed). The dispersants can have particle binding sites in nonionic, anionic, or cationic groups. In many embodiments the dispersant is an anionic binding dispersants, more specifically a phosphorus containing dispersants, such as with phosphate and/or phosphoric acid groups. The dispersants are compatible or soluble in the medium, such as ethylene glycol. In preferred embodiments, the final dispersion is used in a copolyester making reaction, such as polyethylene terephthalate (PET), copolyethylene terephthalate (coPET) and/or copolyethylene naphthalate (coPEN).

In many embodiments, a dispersion includes an infrared light absorbing pigment, a dispersant including phosphorus and a polyol. The infrared light absorbing pigment includes organo-metallic particles. The infrared light absorbing pigment absorbs at a selected wavelength in a range of 750 to 1500 nm or from 750 to 1350 nm or from 750 to 1100 nm at least 1.5 times as strongly as in a visible range of 500-560 nm. At least 99% or at least 99.5% or at least 99.9% of the organo-metallic particles are less than 1.5 micrometer in size or less than one micrometer in size.

In many embodiments, at least 99% or at least 99.5% or at least 99.9% of the organo-metallic particles have a size in a range from 100 nm to 1000 nm. Particles above 1.5 micrometers can cause processing problems and film irregularities. In addition, particles over 1.5 micrometers in size can cause localized over-heating of the large particle, resulting in charring and other defects in a polymer film containing these particles. Particles below 100 nm may, in some cases, be considered an engineered nanoparticle which may not be desirable in some applications.

The organo-metallic particles include a metal. Metals include transition metals, alkali and alkaline earth metals, main Group IIIA, IVA and VA metals, and lanthanides. Lanthanides include La, Ce, Pr, Nd, Sm, Eu, Gd, Tb, Dy, Ho, Er, Tm, Yb, or Lu. In many embodiments the lanthanide is La, Gd, Dy, Er, or Yb. An alkali metal includes Na, K, Rb, or Cs. An alkaline earth metal includes Mg, Ca, Sr, or Ba. In many embodiments the alkaline earth metal is Mg or Ca, A Group IIIA metal includes Al, Ga, In, Tl. In many embodiments the Group IIIA metal is Al, Ga or In. A Group IVA metal includes Si, Sn or Pb. Si is semi-metal. In many embodiments the Group IVA metal is Sn. The Group VA metal is Bi.

In many embodiments the metal includes one or more of Ti, V, Cr, Mn, Fe, Co, Ni, Cu, Zn, Zr, Nb, Pd, Ag, Cd, Ta, W, Pt, or Au. In some embodiments the metal includes one or more of Ti, V, Cr, Mn, Fe, Co, Ni, Cu, Zn, Pd, or Pt. In one embodiment the metal includes Cu.

In many embodiments, the organo-metallic particles include a phthalocyanine moiety. The term "phthalocyanine" includes naphthalocyanine, and the like, and may be substituted or unsubstituted. In some embodiments, the organo-metallic particles include an aromatic ring extended phthalocyanine moiety such as naphthalocyanine moiety. In some other embodiments, the organometallic particles include additional functional group substituted phthalocyanine and naphthalocyanine moiety where substitutions are on the aromatic phthalocyanine or naphthalocyanine ring. In yet another embodiments the organo-metallic particles include one or more of metal containing or metal comprising phthalocyanines and/or naphthalocyanines such as vanadyl naphthalocyanine, tin naphthalocyanine, lead naphthalocyanine, poly-copper phthalocyanine, zinc naphthalocyanine, halogenated copper pthalocyanines, amine functionalized phthalocyanines—and naphthalocyanines, and IR absorbing pigments available under the trade designation AMAPLAST™ IR 1050, AMAPLAST™ IR 1000, and the like from Color Chem Intl., Atlanta, Ga. Organo-metallic particles containing phthalocyanines and/or naphthalocyanine moiety are available from: Sigma Aldrich, Milwaukee, Wis.;

ABCR GmbH and Co. Karlsruhe, Germany; Yamamoto Chemicals Inc. Tokyo, Japan; and Nippon Shokubai, Osaka, Japan.

The dispersion can include any useful amount of infrared light absorbing pigment (or organo-metallic particles). In many embodiments the dispersion includes at least twice the soluble limit of infrared light absorbing pigment (or organo-metallic particles), or at least 10 times the soluble limit of infrared light absorbing pigment (or organo-metallic particles). In many embodiments the dispersion includes at least 1 wt % of the infrared light absorbing pigment (or organo-metallic particles). In some embodiments the dispersion includes at least 5 wt % of the infrared light absorbing pigment (or organo-metallic particles).

The presence of metal can be determined in the dispersion or resin or polymer film, e.g., with the use of ICP-AES (Induction Coupled Plasma—Atomic Emission Spectroscopy). The metal can be determined by any number or techniques such as X-ray Fluorescence Spectroscopy, IR, Raman, UV/VIS, NMR, or Mass-Spec. If the sample size is small and the IR absorbing material is present at a low concentration, a direct observation technique can be utilized. Using either an IR microscope, electron microscopy (in combination with elemental mapping or EELS), or TOF SIMS or ESCA on strategically separated or cut samples to identify the phase with the IR absorbing material. X-ray scattering may be able to be used to eliminate salt and oxide species, thus associating the detected metal with an organo-metallic. With these subtractions for metal salts and oxides, an estimate of the weight loading for the organo-metallic can be obtained. If the organo-metallic is known, then the weight loading of the organo-metallic is simply the weight fraction of the comprised metal divided by the fractional metal content. For example, copper naphthalocyanine has about 9.4% copper content (0.094 weight fraction) and thus a copper loading of 0.094 weight percent in the dispersion, resin or film would be a 1% loading of the organometallic in said material. Copper containing organometallics with potential absorption in the range of 750-1100 nm are expected to have copper fractions in the range 0.02-0.14. Other metal comprising organometallics are expected to range similarly, as scaled by their atomic masses relative to copper (63.5 amu). For example, gold (about 169 amu) containing useful organometallics would be anticipated to range from 5.3% to 37.3% gold. If an organometallic of unknown structure is isolated, its metal content can be measured directly with ICP-AES. If the organo-metallic is unknown and cannot be isolated, a range of organo-metallic weight content can still be estimated using these bounds. Conversion to volume fractions can be obtained with the densities of the organometallic and the density of the material in which it is loaded. Such organometallic densities are anticipated to fall in the range of 1.4 to 2.0 grams per cubic centimeter.

The dispersion includes a phosphorus-containing dispersant. This dispersant is soluble in the polyol at a weight % ratio of at least 1:100. The dispersion includes the phosphorus-containing dispersant in any useful amount. In many embodiments, the phosphorus-containing dispersant is present in the dispersion in a range from 0.1 to 20 wt % or in a range from 0.1 to 10 wt %. In some cases, the phosphorus-containing dispersant comprises a polyether phosphate ester.

Surprisingly these phosphorus-containing dispersants are not necessarily thermally stable at the processing temperature of the polyester polymer or polyester film. For example some phosphorus-containing dispersants have a decomposition temperature of 280 degrees centigrade or less and the processing temperature of some polyester material and film is at least 280 degrees centigrade. In other examples the phosphorus-containing dispersants has a decomposition temperature of 250 degrees centigrade or less and the processing temperature of some polyester material and film is at least 250 degrees centigrade. Thus it is unusual that the organo-metallic particles remain dispersed in the polyester polymer or polyester film since the dispersant decomposes at the polymer processing temperature. As described herein, the phosphorus-containing dispersants apparently stabilize the infrared light absorbing pigments in the dispersions and increase infrared absorption efficiency through shifting the infrared absorption peak to higher wavelengths and boosting peak absorption. In some cases, the phosphorus-containing dispersant can be detected in the resin or the film, e.g. by Nuclear Magnetic Resonance (NMR). For example, the phosphorus may be directly observed in some cases. In other cases, known moieties in a given dispersant, not normally present in the polymers of the resin or film, may be detected. For example, the 1-D proton spectra of the dissolved dispersant, the masterbatch or film, and the raw polymer can be compared to assign peaks in the masterbatch or film spectrum to the dispersant or polymer. Using the structural information, the amount can be quantified. If the dispersant contains an NMR sensitive nucleus that is not present in the polymer, a 1-D spectrum of that nucleus may be collected and quantified using either an internal or external standard. In some cases, the attachment of the moieties to the phosphorous can be confirmed using the multiple bond correlation spectrum (gradient heteronuclear multiple bond correlation experiment also known as gHMBC), e.g. between the proton and the phosphorus.

Phosphorus-containing dispersants are available, e.g., under the trade designation Solplus® or Solsperse® from Lubrizol Corp., Wickliffe Ohio and BYK® or DISPER-BYK® from BYK USA, Wallingford Conn. Particularly useful phosphorus-containing dispersants include Solsperse® 41000, Solsperse® 27000, Solsperse® 43000, Solsperse® 46000, Solplus® D520, Solplus® D540, BYK®-W 9010, and DISPERBYK®-111.

In some embodiments the resin material includes a pigmentary synergist agent used in conjunction with the phosphorus-containing dispersant. In some embodiments this synergist agent is a phthalocyanine synergist. An exemplary phthalocyanine synergist is available under the trade designation Solsperse® 5000 (a phthalocyanine synergist available from Lubrizol Corporation, Wickliffe Ohio USA).

The disclosure also relates to a resin material that includes the dispersion described above and this resin can be useful for forming polymer film, multilayer polymer film, or otherwise formed polymer article. The resin can include a polyester material, an infrared light absorbing pigment dispersed in the polyester material and a dispersant including phosphorus. The resin can include other polymer materials such as PMMA, syndiotactic PS, PC and PET-PC alloys. The polymer films can include other optical elements such as diffuse reflective polarizers. The infrared light absorbing pigment includes organo-metallic particles, as described above. The infrared light absorbing pigment absorbs at a selected wavelength in a range of 750 to 1500 nm or from 750 to 1350 nm or from 750 to 1100 nm at least 1.5 times as strongly as in a visible range of 500-560 nm. A particularly useful infrared band is around 1064 nm or between 1049-1079 nm, typical of many commercially available infrared lasers. In some cases, the infrared light absorbing pigment in the resin or film absorbs in the band from 1049-1079 nm at least 1.5 times as strongly as in a visible range of 500-560 nm. At least 95%, or at least 98%, or at least 99%, or at least 99.5% of the organo-metallic particles are less than 1.5 micrometer in size or less than one micrometer in size, as described above.

The resin includes the infrared light absorbing pigment in any useful amount above the solubility limit. In many embodiments, the infrared light absorbing pigment is present in the resin in a range from 0.01 to 10 wt % or in a range from 0.02 to 5 wt % or in a range from 0.05 to 2 wt %.

The disclosure also relates to a polymer film that includes the resin described above and this polymer film can be a multilayer polymer film or a polymeric blend film. In many embodiments the polymer film is a polyester film. The polyester film can include the dispersion described above. The infrared light absorbing pigment is dispersed in a polyester film layer, or in a blend film layer comprising a polyester. The infrared light absorbing pigment includes organo-metallic particles, as described above. The infrared light absorbing pigment absorbs at a selected wavelength in a range of 750 to 1500 nm or from 750 to 1350 nm or from 750 to 1100 nm at least 1.5 times as strongly as in a visible range of 500-560 nm. At least 95%, or at least 98%, or at least 99%, or at least 99.5% of the organo-metallic particles are less than 1.5 micrometer in size or less than one micrometer in size, as described above.

The polyester film includes the infrared light absorbing pigment in any useful amount, in one or more layers, above the solubility limit. In many embodiments, the infrared light absorbing pigment is present in the polymer film in a range from 0.01 to 5 wt % or in a range from 0.02 to 1 wt % or in a range from 0.05 to 0.5 wt %.

In many embodiments the polyester film includes a plurality of inner layers sandwiched between opposing outer layers. The polyester film can be a multilayer optical film that has been processed (e.g., oriented) to provide the selective filtering characteristic. Such multilayer optical films are discussed in one or more of: WO2010/075357 (Merrill et al.), "Internally Patterned Multilayer Optical Films Using Spatially Selective Birefringence Reduction"; WO 2010/075363 (Merrill et al.), "Internally Patterned Multilayer Optical Films with Multiple Birefringent Layers"; and WO 2010/075373 (Merrill et al.), "Multilayer Optical Films Suitable for Bi-Level Internal Patterning". These references discuss, among other things, multilayer optical films having at least some birefringent interior or inner microlayers, where the multilayer optical film may initially be spatially uniform along the plane of the film, but the multilayer optical film is then subjected to localized heating in a pattern-wise fashion so as to reduce the birefringence of at least some of the interior layers in one in-plane zone relative to another in-plane zone. The reduced birefringence changes the optical transmission and reflection characteristics of the film in the treated areas relative to untreated areas that were not subjected to localized heating. The normally incident transmission through, or the normal angle reflection from, the treated areas of the film may increase or decrease by, for example, 10%, 20%, or 50% or more over a spectral band of interest, e.g., over at least a portion of blue visible wavelengths, relative to untreated areas of the film. The pattern-wise localized heating may be carried out by exposing the multilayer optical film to a suitable patterned or scanned laser beam or other optical radiation that is absorbed by the film, or by exposing selected portions of the multilayer optical film to radiant heat. In any case, the teachings of these references can be used to provide a multilayer optical film suitable for use as the patterned layer. If desired, the multilayer optical films that have been patterned using these techniques can have little or no absorptivity over the selected band of interest (e.g. a portion of blue visible wavelengths) in both the treated and untreated areas, such that, for example, light that is not reflected by the respective portions is substantially transmitted. In some embodiments the multilayer optical film includes a diffuse reflective polarizer.

Surprising the inner polyester film layers have an average thickness of less than 100 nm and thus the particle size of the infrared light absorbing pigment (as measured in the dispersion) is equal to or greater than the thickness of each of these inner layers.

In some embodiments, the polyester film comprises a polymeric blend. The film comprising the blend can be a single, monolithic layer or can be a multilayer. The blend can comprise one or more blend layers. A blend layer can be an interior layer. The blend layer can comprise the infrared light absorbing pigment. The polyester blend film can be an optical film, e.g. a diffuse reflective polarizer or diffuser, that has been processed (e.g., oriented) to provide the diffusive optical characteristic as discussed in WO 2012/003213 (Merrill), "Diffuse Reflective Optical Films with Spatially Selective Birefringence Reduction."

Although various methods can be used, one particularly useful method for determining pigment particle size is X-ray tomography. For example, nano-tomography can be used to find small pigment particles, e.g. less than a micron. Micro-tomography can be used to find larger particles. e.g. over 1.5 micrometers. Typically, tomography identifies regions of high electron density that can be associated to metal-comprising particles, including organometallic particles. Since dust and other foreign objects can settle on the resin or film surface, only the particles essentially embedded within the resin or film are the particles that are considered to be comprised by the resin or film layer.

Typically, analysis of the tomography data can provide a size distribution of particles. This data can be reduced, e.g. to a volume percent of particles over 1.5 micrometers, relative to the total volume of the measured sample. Given an estimate for the weight loading of the pigment, an estimate of the total volume percent of pigment particles over 1.5 micrometers can be derived. For pigment loadings of 5% or less, the volume percent of particles over 1.5 micrometers relative to the total volume of particles can be estimated as the volume percent of particles over 1.5 micrometers relative to the total volume of the measured sample, divided by the weight fraction of the pigment, times the ratio of the density of the resin (or polymer film) to the density of the pigment. The weight fraction of pigment can be estimated through ICP-AES as the weight fraction of metal divided by the weight fraction of metal in the pigment. For example, consider a known polyester resin with density 1.3 grams per cubic centimeter containing an unknown copper-containing organometallic pigment with a total copper content of 0.03 weight percent (i.e. 0.0003 weight fraction). Given a tomography measurement of 0.004 volume percent of particles larger than 1.5 micrometers, then the range for the volume percent of these large particles on a total pigment basis can be determined by choosing the maximum copper fraction of 0.14 and the minimum pigment density of 1.4 grams per cubic centimeter to obtain the upper bound, and by choosing the minimum copper fraction of 0.02 and the maximum pigment density of 2.0 grams per cubic centimeter to obtain the lower bound, resulting in a range of 0.17 to 1.7 volume percent of pigment particles with a size larger than 1.5 micrometers; thus, at least 98% of the organo-metallic particles are less than 1.5 micrometer in size.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. In particular, volume percent is used to describe particle size and distribution. Solvents and other reagents used were obtained from Sigma-Aldrich Corp., St. Louis, Mo. unless specified differently.

Methods

Micro-Tomography

Size distribution can be determined with micro-tomography. In some instances, a higher resolution nano-tomography can be used. Tomography identifies regions of high electron density that can be associated to metal, whereas ICP-AES identifies the metals present. X-ray microtomography data were collected using a Skyscan 1172 (Bruker Micro-CT, Kontich, Belgium) scanner at X-ray generator settings of 40 kilovolts and 240 microamperes. The scanner employed a 10 megapixel Hammatsu detector employed at a 4 K by 2 K resolution and 16 bit gray scale depth. Projected image data were collected at a resolution of 1.5 micrometers per detector pixel as the sample was rotated about 180 degrees at a step size of 0.20 degrees with each projected image accumulated for 1178 milliseconds and 12 averages per collected detector pane. Scanner data collection was accomplished using Skyscan 1172 control software (Bruker Micro-CT, Kontich Belgium, v1.5.9). The resulting 900 projected images were taken through reconstruction applying minor corrections to remove the effects of ring artifacts to produce a stack to 2D slices perpendicular to and along sample data collection rotation axis. Reconstruction was accomplished using Skyscan NRecon (Bruker Micro-CT, Kontich Belgium, v1.6.5.8) software. Matrix and particles were segmented as independent volumes by applying an appropriate gray scale threshold and saving these portions as independent stacks of binary images. Calculation of individual particle and matrix volumes was accomplished using program CTan (Bruker Micro-CT, Kontich Belgium, v1.13.2).

Absorption

Absorption can be measured indirectly by measuring the transmission spectra through a sufficiently thin sample of material, e.g. using a Perkin-Elmer Lambda 950 Spectrophotomer equipped with an integrating sphere to capture scattered light. Reflection from the thin film over the wavelengths of interest can be attributable to surface reflection from the surfaces when interior interference stack reflection are negligible or otherwise absent. The expected transmission to a non-absorbing film can then be calculated based on the surface reflection attenuation from the Fresnel coefficients using the measured refractive index. This is the baseline transmission. The spectra can then be measured with a spectrophotometer equipped with an integrating sphere (to capture scattered transmission) on the film with the absorbing pigment. The absorbance at any wavelength is the negative logarithm of the ratio of the measured transmission to the baseline transmission. For the dispersion, a stock solution of low enough concentration can be made from the dispersion using a suitable solvent. This solution can be placed in a cuvette and spectrally analyzed e.g. using a Lambda 950 spectrophotometer (available from Perkin-Elmer, Waltham, Mass., USA). A reference solution comprising the same medium with dispersants, but without the infrared light absorbing pigment, can be used as a 100% transmission reference. Often a polar solvent is used to make the stock solution. Potentially useful polar solvents include dimethyl sulfoxide, dimethyl formamide, N-methyl-2-pyrrolidone, dimethyl acetamide, phenol, ortho-dichlorobenzene, trichlorobenzene, water, methanol, methyl ethyl ketone, sulfuric acid, trifluoroacetic, tetrahydrofuran, chloroform, and mixtures thereof.

Comparative Example 1

An optical film including a group of interior layers arranged to selectively reflect near infra-red and visible light by constructive or destructive interference was made by the co-extrusion and orientation of multi-layer thermoplastic films in accord with the general methods described by U.S. Pat. No. 5,882,774 (Jonza et al.), U.S. Pat. No. 6,352,761 (Hebrink et al.), U.S. Pat. No. 6,830,713 (Hebrink, et al.), U.S. Pat. No. 6,946,188 (Hebrink, et al.) and International Patent Application WO 2010/075357 A1 (Merrill, et al.). More specifically a so-called coPEN 55/45 with hexane diol substitution as described in Example 10 of U.S. Pat. No. 6,352,761 was co-extruded with a coPEN 90/10 as described in Example 1 of U.S. Pat. No. 6,946,188.

Prior to co-extrusion, a compounded masterbatch of Amaplast® IR-1050, a copper-containing organo-metallic near infra-red absorber (available from ColorChem, Atlanta Ga., USA) was prepared. Copper was not detected in the virgin coPEN55/45 without the Amaplast® IR-1050. Using Induction Coupled Plasma Atomic Emission Spectroscopy (ICP-AES), the dry Amaplast® IR-1050 was shown to contain 3 weight % copper. The Amaplast® IR-1050 was dried at 100° C. and powder fed into the feed throat of a twin-screw extruder equipped with vacuum concurrently with the coPEN 55/45 also dried for 60 hours at 85° C. to make a pre-compounded masterbatch. The weight proportion of Amaplast® IR-1050 to coPEN 55/45 fed was 1:99. Under these conditions of loading, the Amaplast® IR-1050 in the masterbatch behaved like a pigment. X-ray micro-tomography was performed on the masterbatch, revealing the presence of large copper-containing particles. Significantly more than one volume percent of the copper distribution was associated with particles larger than 1.5 micrometers. More specifically, 0.077 volume % of the total sample comprised metal-comprising particles larger than 1.5 micrometers. The loading of the pigment was 1 wt %. The density of the Amaplast® IR-1050 pigment was measured as about 1.534 grams per cubic centimeter and the density of the pigment is estimated as about 1.6 grams per cubic centimeter. Thus the volume % of pigment comprising particles greater than 1.5 microns was estimated to be 6.5%.

CoPEN 90/10 and coPEN 55/45 were extruded and pumped through melt trains at final setpoints of 282° C. and 266° C. respectively, in a proportion of 10:9 on a weight basis, into a 275 layer feedblock set at 279° C. The coPEN 55/45 melt stream was simultaneously fed virgin resin and the masterbatch resin with Amaplast® IR-1050 in a proportion of 2:7. This melt stream also comprised a 30-disc stack of 20 micrometer filters, while the other streams had 7 micrometer filter stacks. The coPEN 90/10 stream also fed the protective boundary stream comprising about 20% of the coPEN 90/10 feed. The feedblock was equipped with a gradient plate with a block factor of 1.15 to create a layer pair thickness gradient through the thickness in this amount. The multilayer flow from the feedblock was combined with two additional co-extruded skin layers streams set at 274° C. comprising Eastman® Copolyester SA115B (available from Eastman Chemicals, Kingsport Tenn. USA). The two outer skins comprised about 32% of the construction by weight. The combined stream was then cast from a die at 279° C. and electrostatically pinned onto a quenching wheel. The cast film showed clear evidence of intermittent multilayer flow defects, e.g. parabolically shaped flow lines as well as rippling flow bands, mostly concentrated across the middle of the cast width. When the masterbatch was removed from the feed and replaced with the same amount of virgin coPEN 55/45 resin to make an equivalent cast film, the flow defects disappeared. The cast film with Amaplast® IR-1050 was subsequently re-heated above the glass transition temperature of the coPEN 90/10, stretched over rollers in a length orienter to a draw ratio of about 3.7, and then heated to approximately 132° C. and stretched transversely to a draw ratio of about 3.8 and then relaxed transversely to a final draw ratio of about 3.7 in a tenter. The film was heat set at about 215° C. after stretching, and then wound into a roll of film. The resulting optical film was approximately 48 micrometers thick. The nominal loading of copper in the total film construction was thus estimated to be 21.1 ppm.

A portion of the film free of obvious flow defects was analyzed. At normal viewing angle, the film was mostly transparent with a grayish hue. At higher off-normal viewing angles, the film shifted to a cyan color. The transmission spectra of the resulting multilayer reflecting film was measured with a Lambda 950 spectrophotometer (available from Perkin-Elmer, Waltham Mass.). The film exhibited a strong reflection band, as manifest as a transmission well in the spectrum, between about 700 and 800 nanometers.

The film was imageable, e.g. the reflectivity could be patterned, by selective exposure to the output of a pulsed fiber laser with a wavelength of 1062 nm (30 W HM series from SPI Lasers, Southampton, UK), e.g. in accord with the methods of International Patent Application WO 2010/075357 A1 (Merrill, et al.); however, processing conditions that significantly reduced the reflectivity without significant charring defects were limited, requiring low laser power and low scan speeds.

Comparative Example 2

A dispersion was made through a media milling process. The dispersant, Solplus® R730 (available from Lubrizol Corporation, Wickliffe Ohio, USA), was soluble in the chosen polyol solvent, ethylene glycol (e.g. as available from MEGlobal, Midland Mich., USA), in at least a 1:1 proportion, forming a clear solution. This dispersant, Solplus® R730, did not contain phosphorus. The thermal stability of the Solplus® R730 was analyzed using a Thermogravimetric Analyzer (TGA Q5000IR) (as available from TA Instruments—Waters LLC, New Castle Del., USA). The TGA showed that over 98 wt % of the dispersant was stable when ramped under dry nitrogen to 250° C. and was over 96 wt % stable under dry nitrogen when ramped to 280° C. A mixture of 76.9 wt % solvent ethylene glycol, 3.85 wt % dispersant Solplus® R730 and 19.2 wt % organo-metallic absorber Amaplast® IR-1050 was made by first combining the ethylene glycol and Solplus® R730 together using a Dispermat CN-10 laboratory high-shear disperser (BYK-Gardner USA, Columbia Md.) until fully dissolved, and then slowly charging in the Amaplast® IR-1050 powder. The mixed dispersion was then milled in a MinCer laboratory media mill (Netzsch, Exton Pa. USA) loaded with 500 grams of a 0.5 mm yttria stabilized zirconia milling media (available from Toray Industries, Tokyo, Japan). The milling proceeded at 4320 rpm. A small amount of sample was taken out periodically and analyzed in order to monitor the milling progress. A Zetasizer NanoZS (available from Malvern Instruments, Inc., Westborough Mass.) was used to estimate a mean particle size of about 0.6 micrometers. Subsequent dispersions, similarly made, were filtered using a Roki HT-10 filter (available from Roki Techno Co., Ltd., Tokyo, JP) with a 2.5 micrometer cut-off. The dispersions rapidly clogged the filters indicating a substantial number of particles over 2.5 micrometers.

A so-called PET masterbatch with the IR absorbing Amaplast® IR-1050 was synthesized according to the following procedure: a stainless steel, electrically heated batch reactor was charged with monomers, catalysts and dispersion. The final charge of materials comprised 58.2 weight % dimethyl terephthalate (DMT) (available from Invista, Wichita Ks. USA), 41.0 weight % ethylene glycol (EG) (available from ME Global, Midland Mich. USA), and 0.7 weight % of the dispersion, as well as 116 ppm of cobalt diacetate tertrahydrate (available from Shepherd Chemical, Cincinnati Ohio USA), 116 ppm zinc diacetate dihydrate (available from Avantor Performance Materials, Center Valley Pa. USA), 233 ppm antimony triacetate (available from Performance Additives, Subang Jaya, Selangor Malaysia) and 251 ppm of triethylphosphonoacetate (TEPA) (available from Mytech Specialty Chemicals Burlington N.C. USA). Initially, the reactor was charged with everything except the TEPA. Under pressure (239.2 kPa), the mixture was heated to 257° C. with removal of esterification reaction by-product, methanol. After the methanol was completely removed, the TEPA was charged to the reactor. After 5 min of dwell time the pressure was then gradually reduced to below 500 Pa while heating to 279° C. The condensation reaction by-product, ethylene glycol, was continuously removed until a resin having an intrinsic viscosity of about 0.50 dL/g, as measured in 60/40 wt. % phenol/o-dichlorobenzene at 30° C., was produced.

A sample of the resin was dried at 85° C. for 48 hours and then pressed under nitrogen between glass slides to form a thin film suitable for spectral analysis. The spectra on the film were taken using a Perkin-Elmer Lambda 950. A zero and 100% transmission baseline correction was taken with a single glass slide in place to account for surface reflections from the front and back surfaces, and then the sample pressed between the glass slides was measured. The resulting ratio of the average absorbance of the band from 1049-1079 nm and the band from 500-560 nm, taken as the negative logarithms of the average measured fractional transmission (e.g. the % transmission divided by 100) was found to be 1.30.

Example 1

A dispersion was made through a media milling process. The phosphorous-containing dispersant, Solplus® D540 (available from Lubrizol Corporation, Wickliffe Ohio USA), was soluble in the chosen polyol solvent, ethylene glycol (e.g. as available from MEGlobal, Midland Mich., USA), in at least a 1:1 proportion, forming a clear solution. Moreover, the thermal stability of the Solplus® D540 was analyzed using a Thermogravimetric Analyzer (TGA Q5000IR) (as available from TA Instruments—Waters LLC, New Castle Del., USA). The TGA showed that over 96 wt % of the dispersant was stable when ramped under dry nitrogen to 195° C. The TGA showed that over 38 wt % of the dispersant was lost when ramped under dry nitrogen to 250° C. and lost over 78 wt % under dry nitrogen when ramped to 280° C. A mixture of 81.37 wt % solvent ethylene glycol, 4.25 wt % dispersant Solplus® D540 and 14.38 wt % organo-metallic absorber Amaplast® IR-1050 was made by first combining the ethylene glycol and Solplus® D540 together using a Dispermat CN-10 laboratory high-shear disperser (BYK-Gardner USA, Columbia Md.) until fully dissolved, and then slowly charging in the Amaplast® IR-1050 powder. The mixed dispersion was then milled in a LabStar laboratory media mill (Netzsch, Exton Pa. USA) loaded with 500 grams of a 0.5 mm yttria stabilized zirconia milling media (available from Toray Industries, Tokyo, Japan). The milling proceeded at 4320 rpm. A small amount of sample was taken out periodically and analyzed in order to monitor the milling progress. The dispersion samples for analysis were further diluted in ethylene glycol and the particle size distribution was measured by a Partica LA-950 Laser Diffraction Particle Size Distribution Analyzer (available from Horiba, Irvine, Calif. USA) equipped with a MiniFlow Cell. The milling proceeded until the desired level of fineness was achieved as characterized by the particle distribution as measured by the Partica LA-950: a mean particle size of approximately 0.3 micrometers was thus achieved; and no measurable portion of the distribution was over 1 micrometers nor under 0.1 micrometers. Furthermore, the dispersion was stable without significant settling prior to use in the subsequent masterbatch resin making.

A stock solution of a suitable solvent, N-methyl-2-pyrrolidone (NMP) as available from EMD Millipore, Bedford Mass., was made with 1.0 weight % of the dispersant Solplus® D540. This stock solution was used to make a 20 ppm Amaplast solution from the dispersion. This solution was placed in a cuvette and spectrally analyzed from 400 to 1200 nm using a Lambda 950 spectrophotometer (available from Perkin-Elmer, Waltham, Mass., USA). Three samples of this solution were measured. The average maximum absorbance of these samples were found at 953 nm. The average absorbance ratio at this maximum to the average absorbance across the visible band from 500 to 560 nm was 2.89.

A so-called coPEN 90/10 masterbatch with the IR absorbing Amaplast® IR-1050 was synthesized according to the following procedure: a stainless steel, oil jacketed batch reactor was charged with monomers and catalysts. The final charge of materials comprised 55.7 weight % dimethyl 2,6-naphthalene dicarboxylate (NDC) (available from BP Amoco Naperville Ill. USA), 4.9 weight % dimethyl terephthalate (DMT) (available from Invista, Wichita Ks. USA), 34.8 weight % ethylene glycol (EG) (available from ME Global, Midland Mich. USA), and 4.5 weight % of the dispersion, as well as 121 ppm of cobalt diacetate tertrahydrate (available from Shepherd Chemical, Cincinnati Ohio USA), 121 ppm zinc diacetate dihydrate (available from Avantor Performance Materials, Center Valley Pa. USA), 303 ppm antimony triacetate (available from Performance Additives, Subang Jaya, Selangor Malaysia) and 242 ppm of triethylphosphonoacetate (TEPA) (available from Mytech Specialty Chemicals Burlington N.C. USA). Initially, the reactor was charged with everything except the TEPA and the dispersion. Under pressure (239.2 kPa), the mixture was heated to 257° C. with removal of esterification reaction by-product, methanol. After the methanol was completely removed, the TEPA was charged to the reactor. After 5 min of dwell time the pressure was gradually reduce to below 500 Pa and the dispersion was charged under pressure raising the kettle pressure to 115.1 kPa. After 5 min of dwell time the pressure was then gradually reduced to below 500 Pa while heating to 279° C. The condensation reaction by-product, ethylene glycol, was continuously removed until a resin having an intrinsic viscosity of about 0.50 dL/g, as measured in 60/40 wt. % phenol/o-dichlorobenzene at 30° C., was produced.

A thin film of resin made was captured during the kettle drain and analyzed. Reflection from the thin film over the wavelengths of interest was essentially attributable to surface reflection from the surfaces. The expected transmission, based on the surface reflection attenuation as calculable from the Fresnel coefficients using the measured refractive index, over a +/−15 nm band about 1064 nm is 89.3% and is 88.2% at 530 nm. The spectra on the film were taken using a Perkin-Elmer Lambda 950. The resulting ratio of the average absorbance of the band from 1049-1079 nm and the band from 500-560 nm was found to be 1.945. When the absorbance peak value around 1000 nm was used, the ratio with the visible band from 500-560 nm was about 2.26.

Under these conditions of loading, the Amaplast® IR-1050 in the masterbatch behaved like a pigment. Using Induction Coupled Plasma Atomic Emission Spectroscopy (ICP), the dry Amaplast® IR-1050 was shown to contain 3 weight % copper. Using ICP, the masterbatch was estimated to contain 0.026 wt % copper. X-ray micro-tomography was performed on the masterbatch, revealing the presence of very few, large particles containing copper. At least 99.5% of the organo-metallic particles were less than 1.5 micrometer in size. More specifically, 0.004 volume % of the total sample comprised metal-comprising particles larger than 1.5 micrometers. The density of the resin is estimated as about 1.3 grams per cubic centimeter and the density of the AMAPLAST® IR-1050 pigment was measured as about 1.534 grams per cubic centimeter. Thus the volume % of pigment comprising particles greater than 1.5 microns was estimated to be 0.39%.

The masterbatch resin was furthermore analyzed using NMR to detect the presence of remaining phosphorus-containing dispersant. Three different analyses were completed. The first was a 1D phosphorus spectrum, the second was a 1D proton spectrum and the third was a multiple bond correlation spectrum between the proton and the phosphorus (gradient heteronuclear multiple bond correlation experiment also known as gHMBC). In each case, a portion of the masterbatch resin was dissolved in a 3:1 volumetric mixture of deuterated trifluoroacetic acid (d-TFA): deuterated chloroform (CDCl3) in a two-dram vial. The sample was transferred to a Wilmad economy grade 5 mm borosiliate NMR tube. The NMR tube was placed in a spinner and pneumatically inserted into a Bruker 500 MHz Avance NMR spectrometer equipped with a cryogenically cooled broad-band NMR probe head. After locking and shimming operations were completed using the deuterium of the CDCl3, the spectra were collected. In the case of the 1D phosphorous spectrum, the data were collected using a 30° pulse width. 128 transients of 128 k points were collected using an approximately 1 second acquisition time with a 2 second recycle delay under constant 1H decoupling. The data were Fourier Transformed (FT) after 20 Hz of exponential apodisation, and zero filling to 256 k points. No linear prediction was used. A clear 1D phosphorous peak was apparent. In the case of the one dimensional (1-D) proton NMR spectrum, the data were collected using a 15° pulse width. 128 transients of 32 k points were collected using at an approximately 4 second acquisition time with no recycle delay. The data were Fourier Transformed (FT) without apodisation, linear prediction, or zero filling. Comparison of the dispersant, pure polymer, and dispersant-containing polymer, permits detection and quantification of the dispersant in the polymer. In this case, the peak at 3.9 ppm was assigned to the known polyethylene glycol moieties in the dispersant. This peak is not observed in the polymer without the dispersant. In the case of the 1H{31P} gHMBC, 128 transients were collected of 1024 points each. A recycle delay of 1 seconds was used. The data were Fourier Transformed in the direct dimension after apodization with a shifted sine bell. No zero filling or linear prediction was used in the direct dimension. The indirect dimension was Fourier Transformed after linear prediction to 1024 points and apodization with a shifted Sine Bell. The data show a clear correlation assigned to the phosphate ester of the dispersant. In this manner, the masterbatch resin was shown to still comprise at least some of the Solplus® D540 dispersant.

Using this masterbatch, a laser-imageable optical film comprising a group of interior layers arranged to selectively reflect near infra-red and visible light by constructive or destructive interference was made by the co-extrusion and orientation of multi-layer thermoplastic films in accord with the general methods described by U.S. Pat. No. 5,882,774 (Jonza et al.), U.S. Pat. No. 6,352,761 (Hebrink et al.), U.S. Pat. No. 6,830,713 (Hebrink et al.), U.S. Pat. No. 6,946,188 (Hebrink, et al.) and International Patent Application WO 2010/075357 A1 (Merrill, et al.). More specifically a coPET with sodium sulfateisophthalate as described in Example 5 as polyester K of Patent Application WO 2007/149955 A2 (Liu, et al henceforth referred to as CoPET-1 was co-extruded with a coPEN 90/10 as described in Example 1 of U.S. Pat. No. 6,946,188.

CoPEN 90/10 and coPET-1 were extruded and pumped through melt trains at final setpoints of 274° C. and 260° C. respectively, in a proportion of 3:4 on a weight basis, into a 275 layer feedblock set at 279° C. The coPEN 90/10 melt stream was simultaneously fed virgin resin and the masterbatch resin with Amaplast® IR-1050 in a proportion of 3:1. The coPET-1 stream also fed the protective boundary stream comprising about 20% of the coPET-1 feed. The feedblock was equipped with a gradient plate with a block factor of 1.5 to create a layer pair thickness gradient through the thickness in this amount. The multilayer flow from the feedblock was combined with two additional co-extruded skin layers streams set at 274° C. of coPEN 90/10 with 0.1 wt % synthetic fumed amorphous silica as a slip agent. The two outer skins comprised about 18 weight % of the film construction. The combined stream was then cast from a die at 279° C. and electrostatically pinned onto a quenching wheel. The cast film showed no evidence of flow defects. The cast film with Amaplast® IR-1050 was subsequently re-heated above the glass transition temperature of the coPEN 90/10, stretched over rollers in a length orienter to a draw ratio of about 3.7, and then heated to approximately 125° C. and stretched transversely to a draw ratio of about 3.5 and then slightly relaxed transversely to a final draw ratio of just under 3.5 in a tenter. The film was heat set at about 238° C. after stretching, and then wound into a roll of film. The resulting optical film was approximately 69 micrometers thick. The nominal loading of copper in the total film construction, attributable to the Amaplast® IR-1050, was thus estimated to be 24.3 ppm.

The film was a broad-band reflector with a silver appearance at normal and off-normal viewing angles. The transmission spectra of the resulting multilayer reflecting film was measured with a Lambda 950 spectrophotometer (available from Perkin-Elmer, Waltham Mass.). The film exhibited a strong normal incidence reflection band, as manifest as a transmission well in the spectrum with measured transmission ranging from about 1% to 12% between about 400 and 900 nanometers. The transmission of the film was clearly reduced in a band about 1064 nm relative to the expected baseline transmission without the Amaplast® IR-1050 absorber, clearly indicating the presence of this organometallic IR-absorbing pigment. Using ICP, the film: no large metal-comprising particles were detected in the interior of the film. Thus, at least 99.5% of the organo-metallic particles were less than 1.5 micrometer in size.

The film was furthermore analyzed using NMR to detect the presence of remaining phosphorus-containing dispersant in a similar manner to the method used on the master batch resin. Again, a clear phosphorous spectrum was apparent. As in the case of the masterbatch resin, for the 1D proton spectrum, the 3.9 ppm chemical shift was assigned to the polyethylene glycol moieties of the residual dispersant. A 0.25 cm2 sample of the film was dissolved in a 3:1 volumetric mixture of deuterated trifluoroacetic acid (d-TFA): deuterated chloroform (CDCl3) in a two-dram vial. The sample was transferred to a Wilmad economy grade 5 mm borosiliate NMR tube. The NMR tube was placed in a spinner and pneumatically inserted into a Bruker 500 MHz Avance NMR spectrometer equipped with a cryogenically cooled broad-band NMR probe head. After locking and shimming operations were completed using the deuterium of the CDCl3, one dimensional (1-D) proton NMR data were collected using a 15° pulse width. 128 transients of 32 k points were collected using an approximately 4 second acquisition time with no recycle delay. The data were Fourier Transformed (FT) without apodisation, linear prediction, or zero filling. Again, the 3.9 ppm chemical shift peak was observed above the baseline. In this manner, the film was shown to still comprise at least some of the Solplus® D540 dispersant.

The film was imageable, e.g. the reflectivity could be patterned, by selective exposure to the output of a pulsed fiber laser with a wavelength of 1062 nm (30 W HM series from SPI Lasers, Southampton, UK), e.g. in accord with the methods of International Patent Application WO 2010/075357 A1 (Merrill, et al.). The laser was impinged on the side of the film containing the thinner layers of the optical stack. Significant reflectivity reduction (increases over) was accomplished without charring or other defects at a pulse rate (repetition rate) of 250 kHz, and an average power of 5.4 watts. The output of the laser was fiber delivered to a hurrySCAN 25 galvanometer scanner (SCANLAB AG, Puccheim, Germany) and focused using an f-theta lens with a numerical aperture of 0.15 (Sill Optics GmbH, Wendelstein, Germany). In order to minimize laser damage to the films, the focal point of the f-theta lens was located approximately 8 mm above the surface of the samples. The laser beam was manipulated with the galvanometer scanner to produce 4 mm×4 mm squares of exposed lines on the samples at each laser condition, with individual scan lines separated by a distance of 100 micrometers at a scan rate of 200 mm/sec.

Example 2

A cast film similar to the pre-cursor cast film of Example 1 was made; however, a 1:2 loading of masterbatch to virgin coPEN 90/10 was fed into the feedblock and thicker skins, comprising 36 weight % of the final construction was made.

Reflection from the cast web over the wavelengths of interest were essentially attributable to surface reflection from the surfaces. The expected transmission, based on the surface reflection attenuation as calculable from the Fresnel coefficients using the measured refractive index, over a +/−15 nm band about 1064 nm is 89.3% and is 88.2% at 530 nm. The spectra on the final cast film were taken using a Perkin-Elmer Lambda 950. The resulting ratio of the average absorbance of the band from 1049-1079 nm and the band from 500-560 nm was found to be 2.077.

The cast film was stretched to make an oriented film similarly to the drawn film of example 1. The film exhibited a strong normal incidence reflection band, as manifest as a transmission well in the spectrum, between about 400 and 900 nanometers. The transmission of the film was clearly reduced in a band about 1064 nm relative to the expected baseline transmission without the Amaplast® IR-1050 absorber.

Using a laser at 1064 nm, the final drawn film was imageable, e.g. the reflectivity could be patterned, e.g. in accord with the methods of and International Patent Application WO 2010/075357 A1 (Merrill, et al.).

Example 3

A dispersion was made through a media milling process. The phosphorous-containing dispersant, Solplus® D540 (available from Lubrizol Corporation, Wickliffe Ohio USA), was soluble in the chosen polyol solvent, ethylene glycol (e.g. as available from MEGlobal, Midland Mi., USA), in at least a 1:1 proportion, forming a clear solution. A mixture of 84.13 wt % solvent ethylene glycol, 3.44 wt % dispersant Solplus® D540, 11.47 wt % organo-metallic absorber Amaplast® IR-1050 and 0.96 wt % co-dispersant Solsperse® 5000 (a phthalocyanine synergist available from Lubrizol Corporation, Wickliffe Ohio USA) was made by first combining the ethylene glycol, Solplus® D540 and Solsperse® 5000 together using a Dispermat CN-10 laboratory high-shear disperser (BYK-Gardner USA, Columbia Md.) until fully dissolved, and then slowly charging in the Amaplast® IR-1050 powder. The mixed dispersion was then milled in a LabStar laboratory media mill (Netzsch, Exton Pa. USA) loaded with 1700 grams of a 0.5 mm yttria stabilized zirconia milling media (available from Toray Industries, Tokyo, Japan). The milling proceeded at 3500 rpm. A small amount of sample was taken out periodically and analyzed in order to monitor the milling progress. The dispersion samples for analysis were further diluted in ethylene glycol and the particle size distribution was measured by a Partica LA-950 Laser Diffraction Particle Size Distribution Analyzer (available from Horiba, Irvine, Calif. USA) equipped with a MiniFlow Cell. The milling proceeded until the desired level of fineness was achieved as characterized by the particle distribution as measured by the Partica LA-950: a mean particle size of approximately 0.16 micrometers was thus achieved; and no measurable portion of the distribution was over 1 micrometer nor under 0.1 micrometers. Furthermore, the dispersion was stable without significant settling prior to use in the subsequent masterbatch resin making.

A polyethylene terephthalate (PET) masterbatch with the IR absorbing Amaplast® IR-1050 was synthesized according to the following procedure: a stainless steel, electrically heated batch reactor was charged with monomers, stabilizer and catalysts. The final charge of materials comprised 54.7 weight % dimethyl terephthalate (DMT) (available from Invista, Wichita Ks. USA), 38.5 weight % ethylene glycol (EG) (available from ME Global, Midland Mi. USA), and 6.7 weight % of the dispersion, as well as 109 ppm of cobalt diacetate tetrahydrate (available from Shepherd Chemical, Cincinnati Ohio USA), 109 ppm zinc diacetate dihydrate (available from Avantor Performance Materials, Center Valley, Pa. USA), 274 ppm antimony triacetate (available from Performance Additives, Subang Jaya, Selangor Malaysia) and 219 ppm of triethylphosphonoacetate (TEPA) (available from Mytech Specialty Chemicals Burlington N.C. USA). Initially, the reactor was charged with everything except the TEPA and the dispersion. Under pressure (239.2 kPa), the mixture was heated to 257° C. with removal of esterification reaction by-product, methanol. After the methanol was completely removed, the TEPA was charged to the reactor. After 5 min of dwell time, the dispersion was charged under pressure. After 5 min of dwell time the pressure was then gradually reduced to below 500 Pa while heating to 279° C. The condensation reaction by-product, ethylene glycol, was continuously removed until a resin having an intrinsic viscosity of about 0.50 dL/g, as measured in 60/40 wt. % phenol/o-dichlorobenzene at 30° C., was produced.

A sample of the resin was dried at 85° C. for 48 hours and then pressed under nitrogen between glass slides to form a thin film suitable for spectral analysis. The spectra on the film were taken using a Perkin-Elmer Lambda 950. A zero and 100% transmission baseline correction was taken with a single glass slide in place to account for surface reflections from the front and back surfaces, and then the sample pressed between the glass slides was measured. The resulting ratio of the average absorbance of the band from 1049-1079 nm and the band from 500-560 nm, taken as the negative logarithms of the average measured fractional transmissions (e.g. the % transmissions divided by 100) was found to be 1.64.

Under these conditions of loading, the Amaplast® IR-1050 in the masterbatch behaved like a pigment. Using Induction Coupled Plasma Atomic Emission Spectroscopy (ICP), the dry Amaplast® IR-1050 and dry Solsperse® 5000 were shown to contain 3 and 5.45 weight % copper, respectively. Using ICP, the masterbatch was estimated to contain 0.0342 weight % copper from Amaplast® IR-1050 (i.e. approximately 1.1 wt % loading Amaplast® IR-1050) and 0.0051 weight % copper from Solsperse® 5000.

Using this masterbatch, a laser-imageable optical film comprising a group of interior layers arranged to selectively reflect near infra-red and visible light by constructive or destructive interference was made by the co-extrusion and orientation of multi-layer thermoplastic films in accord with the general methods described by U.S. Pat. No. 5,882,774 (Jonza et al.), U.S. Pat. No. 6,352,761 (Hebrink et al.), U.S. Pat. No. 6,830,713 (Hebrink, et al.), U.S. Pat. No. 6,946,188 (Hebrink, et al.) and International Patent Application WO 2010/075357 A1 (Merrill, et al.). More specifically so-called coPMMA, Atoglas prd-510A (Available from Arkema, Philadelphia Pa. USA) was co-extruded with PET.

PET, Tairilin AA48, (available from Nanya, Lake City S.C. USA) and coPMMA were extruded and pumped through melt trains at final setpoints of 274° C. and 260° C. respectively, in a proportion of 10:9 on a weight basis, into a 151 layer feedblock set at 274° C. The PET melt stream was simultaneously fed the virgin PET resin and the PET masterbatch resin with Amaplast™ IR-1050 in a proportion of 8:1. The PET stream also fed the protective boundary stream comprising about 8% of the coPET-1 feed. The feedblock was equipped with a gradient plate with a block factor of 1.15 to create a layer pair thickness gradient through the thickness in this amount. The multilayer flow from the feedblock was combined with two additional co-extruded skin layers streams set at 274° C. of PET, Tairilin 1N404. The two outer skins comprised about 57 weight % of the film construction. The combined stream was then cast from a die at 275° C. and electrostatically pinned onto a quenching wheel to form a cast film 490 micrometers thick. The cast film was a neutral gray in appearance.

The cast film with Amaplast® IR-1050 was subsequently stretched in a KARO IV laboratory stretcher (available from Brueckner, Portsmouth N.H. USA). The cast web was preheated for 60 seconds at 95° C. and then stretched at a uniform separation speed of the grippers corresponding to an initial strain rate 5% per second to draw ratios of 4.7 and 5.0 in two in-plane orthogonal directions. The films was subsequently heat set after drawing at heat set at 180° C. after stretching. The resulting optical film was approximately 20 micrometers thick.

The film was a far-red, near-infra reflector. The transmission spectra of the resulting multilayer reflecting film was measured with a Lambda 950 spectrophotometer (available from Perkin-Elmer, Waltham Mass.). The film exhibited a strong normal incidence reflection band, as manifest as a transmission well in the spectrum, between about 660 and 740 nanometers, with a minimum transmission under 2%. The transmission of the film was discernably reduced in a band about 1064 nm relative to the expected baseline transmission without the Amaplast® IR-1050 absorber.

The film was imageable, e.g. the reflectivity could be patterned at much higher power, without charring, than the film of Comparative Example 2, by selective exposure to the output of a pulsed fiber laser with a wavelength of 1062 nm (30 W HM series from SPI Lasers, Southampton, UK), e.g. in accord with the methods of International Patent Application WO 2010/075357 A1 (Merrill, et al.).

Thus, embodiments of STABILIZED INFRARED ABSORBING DISPERSIONS are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A polymer film comprising
   an infrared light absorbing pigment dispersed in a polymer film layer, the infrared light absorbing pigment comprising organo-metallic particles, the infrared light absorbing pigment absorbs at a selected wavelength in a range of 750-1100 nm at least 1.5 times as strongly as in a visible range of 500-560 nm, at least 98% of the organo-metallic particles are less than 1.5 µm in size;
   wherein the polymer film comprises a plurality of polyester film layers and a plurality of inner polyester film layers have an average thickness of less than 100 nm;
   a dispersant comprising phosphorus; and
   wherein the infrared light absorbing pigment comprises copper and phthalocyanine moieties.

2. The polymer film according to claim 1, wherein the organo-metallic particles comprise Ti, V, Cr, Mn, Fe, Co, Ni, Cu, Zn, Zr, Nb, Pd, Ag, Cd, Ta, W, Pt, or Au.

3. The polymer film according to claim 1, wherein the polymer film layer comprises 0.02 to 1 wt % infrared light absorbing pigment.

4. The polymer film according to claim 1, wherein the polymer film layer comprises a phthalocyanine synergist.

* * * * *